United States Patent [19]

Dufresne

[11] Patent Number: 4,814,641
[45] Date of Patent: Mar. 21, 1989

[54] ELECTRIC SAFETY SUPPLY APPARATUS AND CONNECTOR DEVICE COMBINATION

[76] Inventor: Jacques Dufresne, 6889, avenue Lamont, Montreal (Quebec), Canada, H4E 2T8

[21] Appl. No.: 139,639

[22] Filed: Dec. 30, 1987

[51] Int. Cl.⁴ .................. H02H 3/14; H02H 1/02; H02H 3/16
[52] U.S. Cl. .................. 307/326; 307/131; 340/650; 340/652; 361/50
[58] Field of Search .................. 307/125, 131, 326; 340/649, 650, 652; 361/42, 49, 50

[56] References Cited

U.S. PATENT DOCUMENTS

| | | | |
|---|---|---|---|
| 3,618,065 | 11/1971 | Trip et al. | 340/280 |
| 3,766,434 | 10/1973 | Sherman | 361/50 |
| 3,783,340 | 1/1974 | Becker | 340/652 |
| 4,011,483 | 3/1977 | Meadows | 340/652 |
| 4,093,336 | 6/1978 | Rose | 339/180 |
| 4,148,536 | 4/1979 | Petropoulsos et al. | 339/42 |
| 4,152,557 | 5/1979 | Busch et al. | 200/51.09 |
| 4,346,419 | 8/1982 | Janniello | 361/2 |

FOREIGN PATENT DOCUMENTS

| | | |
|---|---|---|
| 551177 | 1/1958 | Canada . |
| 896749 | 3/1972 | Canada . |
| 902232 | 6/1972 | Canada . |
| 1048597 | 2/1979 | Canada . |
| 1048599 | 2/1979 | Canada . |
| 1074000 | 3/1980 | Canada . |

Primary Examiner—L. T. Hix
Assistant Examiner—David Porterfield
Attorney, Agent, or Firm—Robic, Robic & Associates

[57] ABSTRACT

In an electrical appliance having an electrically conducting housing, defective grounding of the housing may result in a dangerous situation for the user. To prevent such a dangerous situation, the appliance, also having an internal, load circuit, is provided with a safety connector device, which connector device comprises an electric plug having two power contacts through which the load circuit is energized, and two auxiliary contacts. The two latter, auxiliary contacts are respectively connected to two separate points of the housing so that they are interconnected together through an interconnecting circuit including the electrically conducting housing of the appliance. One of the two auxiliary contacts is connectable to a ground for grounding the housing whereby a disconnection of the ground from the housing can be detected by sensing a discontinuity in the interconnecting circuit.

8 Claims, 3 Drawing Sheets

ELECTRIC SAFETY SUPPLY APPARATUS AND CONNECTOR DEVICE COMBINATION

FIELD OF THE INVENTION

The present invention relates to safe grounding of the electrically conducting housing of an electrical appliance.

BACKGROUND OF THE INVENTION

Many devices have been proposed for safely grounding the housing of an electrical appliance, one of these devices is described in Canadian Patent No. 1,074,000 issued Mar. 18, 1980 to Helwig. This known apparatus comprises a cordless electrical appliance, an adaptor unit for the appliance, and a base unit. The base unit is provided with supply-voltage-connection contacts for connection to a supply voltage, and with two appliance-current-supply contacts. The base unit also includes an appliance-current-path connected between the supply-voltage-connection contacts and the appliance-current-supply contacts. In the base unit, a step down transformer with a secondary winding produces an auxiliary, low amplitude current, flowing through an auxiliary-current-path when a pair of auxiliary contacts are electrically interconnected, one of these auxiliary contacts being grounded. A relay is responsive to the auxiliary, low amplitude current in its control winding to close a relay switch connected in the appliance-current-path. The adaptor unit is provided with two appliance-current-supply contacts electrically connected to the internal, load circuit of the electrical appliance, and with a pair of auxiliary short-circuited contacts respectively engageable with the auxiliary contacts of the base unit for interconnecting the said pair of auxiliary contacts of the base unit. The appliance comprises an electrically conducting housing electrically connected to the short-circuited auxiliary contacts. When the adaptor unit is placed on the base unit, the appliance-current-supply contacts of the adaptor unit engages those of the base unit to supply with electric power the internal, load circuit of the appliance, the auxiliary contacts of the base unit are interconnected together to establish the auxiliary current, and the housing of the electrical appliance is grounded through the said grounded one of the auxiliary contacts of the base unit, and through the auxiliary contact of the adaptor unit connected to the latter grounded auxiliary contact of the base unit.

Although the above described prior art device permits to check appropriate connection between the auxiliary contacts of the base and adaptor unit, it cannot detect disconnection of the housing of the electrical appliance from the short-circuited auxiliary contacts, and therefore from the ground.

OBJECTS OF THE INVENTION

It is an object of the present invention to provide in combination, an electrical appliance comprising an electrically conducting housing, and a safety connector device for safely grounding the said housing.

It is also an object of the present invention to provide a method for safely grounding the electrically conducting housing of an electrical appliance.

SUMMARY OF THE INVENTION

According to the present invention, there is provided in combination, (a) an electrical appliance comprising an electrically conducting housing to be grounded, and an internal, load circuit, and (b) a safety connector device comprising an electric plug with at least two first, power contacts through which the said internal, load circuit can be energized, and two second auxiliary contacts respectively connected to two separate points of the said housing so that the said two auxiliary contacts are interconnected together by an interconnecting circuit including the said housing, a first one of the two second contacts being connectable to a ground for grounding the said housing whereby a disconnection of the said ground from the said housing can be detected by sensing a discontinuity in the said interconnecting circuit.

The combination according to the invention may further comprise a protective supply apparatus for safely coupling an electric power source provided with said ground and with at least two power terminals to the said internal, load circuit of the electrical appliance via the said safety connector device, comprising:

input contact means including at least two third, power contacts to be respectively connected to the said at least two power terminals, and a fourth, ground contact to be connected to the said ground of the power source;

a first outlet in which the electric plug of the said safety connector device can be inserted, said first outlet having at least two fifth, power contacts respectively connected to the said at least two first contacts when the said electric plug is inserted in the said first outlet, and two sixth auxiliary contacts respectively connected to the said two second contacts when the said electric plug is inserted in the said first outlet, a first one of said two sixth contacts, connected to the said first one of the second, auxiliary contacts connectable to the said ground, being connected to the said fourth, ground contact for grounding the said electrically conducting housing;

a first current path circuit for connecting the said at least two third power contacts to the said at least two fifth, power contacts, respectively;

a step down transformer means having a primary winding connected between the said at least two power terminals of the said source, and a first secondary winding having two winding terminals;

a second current path circuit for connecting the two terminals of the said first secondary winding to the said two sixth, auxiliary contacts, respectively, so that when the said electric plug of the safety connector device is inserted in the said first outlet a low amplitude current generated through the first secondary winding flows through the said second current path circuit, through the said second and sixth, auxiliary contacts and through the said interconnecting circuit including the electrically conducting housing of the electric appliance; and a first relay means having (i) a first control coil connected in series with the said second current path circuit, so that the said low amplitude current flows through said first control coil and (ii) first normally open switch means connected in series with the said first current path circuit, closed when the said low amplitude current flows through the first control coil so that the two third contacts are connected to the two fifth contacts, respectively, and the internal, load circuit of the electrical appliance supplied with electric current from the power source through the third contacts, the first current path circuit, and the first and fifth contacts, and opened in response to a discontinuity in the said interconnecting circuit including the said housing, which discontinuity can be caused by disconnection of the said electrically conducting housing from the ground of the power source and interrupts the low amplitude electric current to open the first normally open switch means whereby the first current path circuit is opened and the internal, load circuit of the said appliance is de-activated.

According to another aspect of the present invention, there is provided a method for safely grounding an electrically conducting housing of an electrical appliance by connecting the said housing to a ground of an electric power source, comprising the steps of:

connecting the said ground to a first point of the said housing via first contact means;

connecting second contact means to a second point of the said housing, the said second point being different from the said first point so that the said first and second contact means are interconnected through an interconnecting circuit including the said housing;

establishing a low amplitude electric current through the second contact means, the said interconnecting circuit and the first contact means; and detecting the said low amplitude electric current, detection of the said low amplitude electric current being indicative of electrical interconnection of the first and second contact means through the interconnecting circuit including the said housing, and consequently of a safe connection of the housing of the electrical appliance to the ground of the said power source.

The objects, advantages and other features of the present invention will become more apparent upon reading of the following non restrictive description of preferred embodiments thereof, given for the purpose of exemplification only with reference to the accompanying drawings.

DETAILED DESCRIPTION OF THE PREFERRED EMBODIMENTS

Figure 1:
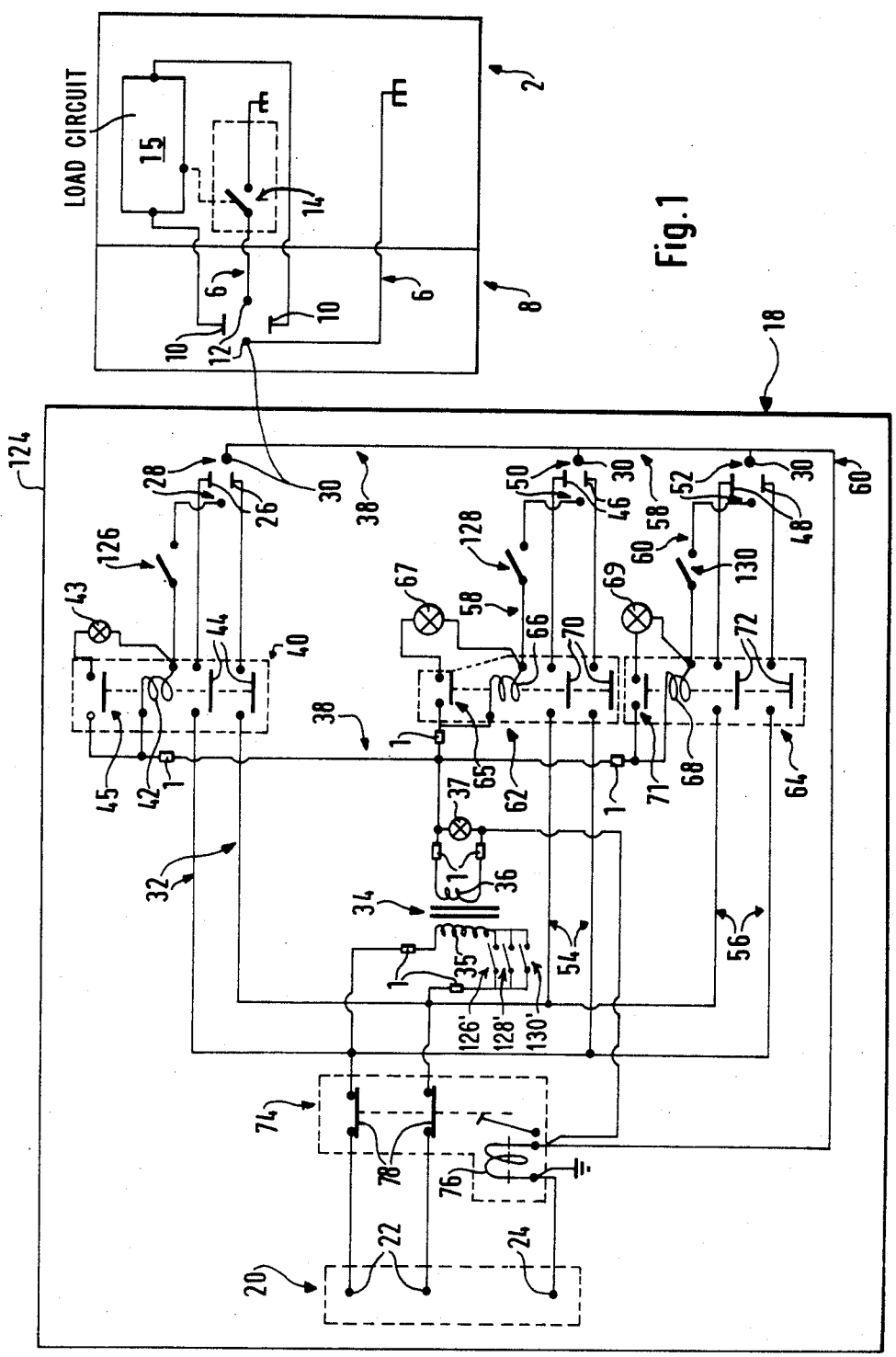
FIG. 1 represents, in a schematic diagram form, an embodiment of and electrical appliance, a safety connector device and a protective supply apparatus in combination according to the present invention.

In FIG. 1, there is illustrated in combination, an electrical appliance 2 comprising an electrically conducting housing to be grounded and an internal, load circuit 15, and a safety connector device 8 comprising an electric plug. The electric plug has two power contacts 10 through which the internal load circuit 15 is energized, and two auxiliary contacts 12. The two auxiliary contacts 12 are respectively connected to two separate points of the electrically conducting housing so that these two auxiliary contacts 12 are interconnected together through an interconnecting circuit 6 including the electrically conducting housing. The one 30 of the auxiliary contacts 12 of FIG. 1 is connectable to a ground for grounding the housing whereby a disconnection of the ground from the housing can be detected by sensing a discontinuity in the interconnection circuit 6 including the housing of the appliance.

As shown in FIG. 1, a protective supply apparatus 18 safety couples a power source (not shown) provided with a ground to the load circuit 15 of the electrical appliance 2 via the safety connector device 8. The protective supply apparatus 18 comprises input contact means 20 having two power contacts 22 to be respectively connected to two power terminals of the source and a ground contact 24 to be connected to the ground of the power source. The protective supply apparatus also comprises a first, second and third outlet having respectively two first 26, two second 46 and two third 48 power contacts, and two first 28, two second 50 and two third 52 auxiliary contacts. A first one 30 of each pair of first 28, second 50, and third 52 auxiliary contacts is connected to the ground contact 24. A first 32, a second 54 and a third 56 power current path circuits connect respectively the two first 26, the two second 46 and the two third 48 outlet power contacts to the input power contacts 22.

The protective supply apparatus 18 further comprises a step down transformer 34 having a primary winding 35, having its two terminals respectively connected to the two input contacts 22. The transformer 34 also comprises a secondary winding 36. The ratio of the transformer 34 is selected so that a voltage of low amplitude is produced accross the winding 36 in response to the voltage between the contacts 22 supplied to the primary winding 35. A first 38, a second 58 and a third 60 low amplitude current path circuit respectively connect the two first 28, the two second 50 and the two third 52 auxiliary contacts to the two terminals of the secondary winding 36.

A first 40, a second 62 and a third 64 relay respectively comprise a first 42, a second 66 and a third 68 control coils respectively connected in series with the first 38, the second 58 and the third 60 low amplitude current path circuits, and a first 44, a second 70 and a third 72 pairs of normally open switches are respectively connected in series with the first 32, the second 54 and the third 56 power current path circuits.

A fourth relay 74 is provided with a fourth control coil 76, the first one 30 of each pair of auxiliary contacts 28, 50 and 52 being connected to the input, ground contact 24 via the fourth control coil 76. The fourth relay 74 is also provided with a pair of normally closed switches 78, the pair of input power contacts 22 being connected to each pair of outlet power contacts 26, 46 and 48 via the pair of normally closed switches 78. As can be seen the power contacts 22 are also connected to the primary winding 35 of the step down transformer 34 via the pair of normally closed switches 78.

A light bulb 37 is connected in parallel with the secondary winding 36 to indicate energizing of the step down transformer 34. A light bulb 43 in series with a normally open switch 45 of the relay 40 is connected in parallel with the first control coil 42 and is energized in response to closure of the switch 45 to indicate energizing of the coil 42 and closure of the switches 44, a light bulb 67 in series with a normally open switch 65 of the relay 62 is connected in parallel with the coil 66 and is energized in response to closure of the switch 65 to indicate energizing of the coil 66 and closure of the switches 70, and a light bulb 69 in series with a normally open switch 71 of the relay 64 is connected in parallel with the control coil 68 and is energized in response to closure of the switch 71 to indicate energiging of the coil 68 and closure of the switches 72.

The protective supply apparatus is also provided with fuses 1 for the protection of certain components of this apparatus. Two fuses 1 are connected in series with the primary winding 35 of the step down transformer 34, while two other fuses 1 are connected in series with the secondary winding 36 of the step down transformer 34. Other fuses 1 are connected in series with each of the low power current path circuits 38, 58 and 60.

When the electric plug of the safety connector device 8 is inserted in one of the outlets of the supply apparatus 18, the power contacts 10 of the plug are connected to the power contacts 26, 46 or 48 of the outlet and the auxiliary contacts 12 of the plug are connected to the auxiliary contacts 28, 50 or 52 of the outlet with the auxiliary contacts identified by the reference 30 connected together. Accordingly, a low amplitude current flows through the low amplitude current path circuit 38, 58 or 60, the control coil 42, 66 or 68 to close the switches 44, 70 or 72, the auxiliary contacts 28, 50 or 52, the auxiliary contacts 12 of the plug and the circuit 6 including the housing of the appliance 2 which interconnects the auxiliary contacts 12. As the switches 44, 70 or 72 are closed, the load circuit 15 of the electrical appliance 2 is supplied with electric energy from the contacts 22 through the normally closed switches 78, the current path circuit 32, 54 or 56, the closed switches 44, 70 or 72, the power contacts 26, 46 or 48 of the outlet, and the power contacts 10 of the plug.

When a discontinuity occurs in the circuit 6 interconnecting the auxiliary contacts 12 through the housing of the appliance 2, which discontinuity can be caused by disconnection of this housing from the auxiliary contact 30 of the plug and therefore from the ground contact 24, resulting in unappropriate grounding of the housing which can be dangerous for the user of the appliance, the low amplitude current path circuit 38, 58 or 60 is opened so that the control coil 42, 66 or 68 is de-energized, the switches 44, 70 or 72 are opened to open the corresponding current path circuit 32, 54 or 56, and the load circuit 15 of the electrical appliance is de-energized. Moreover, a fault detection switch 14 is responsive to a fault in the circuit 15 to produce a discontinuity in the circuit 6 interconnecting the two contacts 12 so that the load circuit 15 of the electrical appliance is deactivated as explained hereinabove.

Upon occurrence of a fault causing application of a voltage to the housing of the electric appliance, which application of voltage can be dangerous for the user of the electrical appliance 2, a high amplitude ground fault current flows through the housing of the appliance 2, the one 30 of the auxiliary contacts 12 of FIG. 1, the one 30 of the contacts 28, 50 or 52 of the outlet, and the control coil 76 of the relay 74. The ground current in the coil 76 causes opening of the normally closed switches 78, whereby both the supply apparatus 18 and the appliance 2 are de-energized to eliminate the situation dangerous for the user.

Of course, an electrical appliance such as 2 can be connected to each of the outlets of the apparatus 18 through its safety connector device 8.

The protective supply apparatus 18 also comprises a frame enclosure 124, three covers (not shown) advantageously hinged on the frame enclosure 124 for covering the three outlets, respectively, a first push button mechanically operated by the cover of the first outlet and comprising two switches 126, 126' closed when the cover is open and open when the cover is closed, a second push button mechanically operated by the cover of the second outlet and including two switches 128, 128' which are closed when the cover is open and open when the cover is closed, and a third push button mechanically operated by the cover of the third outlet and including two switches 130, 130' both closed when the cover is open and both open when the cover is closed. Accordingly, the transformer 34 works only when one of the three covers is opened to close one of the switches 126', 128' and 130', and thereby to supply the primary winding 35 with electric energy through the closed switch 126',128' and/or 130'. In the same manner, the control coils 42, 66 and 68 can be energized only when the corresponding ones of the three covers are opened to close the associated switches 126, 127 and 128 disposed on the low amplitude current path circuits 38, 58 and 60, respectively. When all of the covers are closed, the switches 126, 126', 128, 128', 130 and 130' are open, whereby no supply of the primary winding 35 nor of the control coils 42, 66 and 68 is possible, thereby preventing closure of the switches 44, 70 and 72 and energizing of the power contacts 26, 46 and 48.

Figure 2:
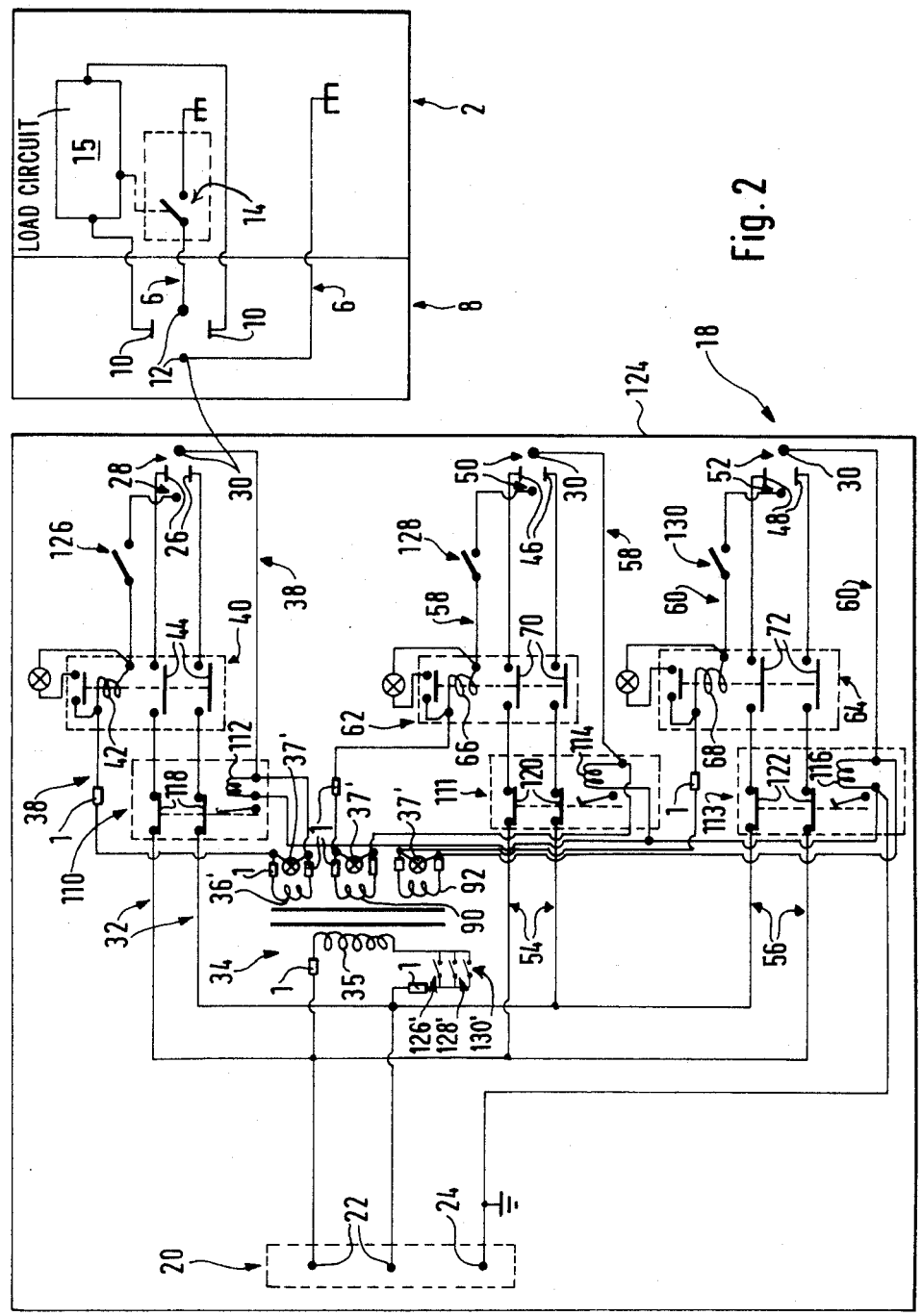
FIG. 2 represents, in a schematic diagram form, another embodiment of an electrical appliance, a safety connector device, and a protective supply apparatus in combination according to the present invention.

FIG. 2 illustrates another embodiment of the invention comprising in combination, an electrical appliance 2 and a safety connector device 8 both similar to those of FIG. 1, and a protective circuit apparatus 18 generally similar to that of FIG. 1 for safely coupling a power source (not shown) to the electrical appliance 2. Most of the elements of FIG. 2 correspond to analogous ones of FIG. 1 and are therefore identified by the same reference numerals.

The step-down transformer 34 of the protective supply apparatus 18 of FIG. 2 comprises a first 36', a second 90 and a third 92 secondary winding for respectively supplying a first, second and third low amplitude voltage. The first 38, second 58 and third 60 low amplitude current path circuits connect respectively the two terminals of the secondary windings 36', 90 and 92 to the pairs of auxiliary contacts 28, 50 and 52. The protective supply apparatus 18 also comprises relays 110, 111 and 113 having respective control coils 112, 114 and 116. The contacts 30 of the pairs of auxiliary contacts 28, 50 and 52 are connected to the ground contact 24 via the control coils 112, 114 and 116, respectively. The relays 110, 111 and 113 further include a respective pair of normally closed switches 118, 120 and 122. The pairs of power contacts 26, 46 and 48 are connected to the pair of power contacts 22 via respectively the switches 118, 120 and 122. When the plug (contacts 10 and 12) of the electrical appliance is inserted in one of the outlets, (contacts 26 and 28, 46 and 50, or 48 and 52), and a ground, fault current from the housing of the appliance 2 flows through the contact 30 of the auxiliary contacts 28, 50 or 52, and the control coil 112, 114 or 116, the switches 118, 120 or 122 open to de-energizing the electrical appliance 2 by opening the current path circuit 32, 54 or 56.

The two power contacts 22 are, in the embodiment of FIG. 2, connected to the primary winding 35 directly through the switches 126', 128' and 130', and a pair of fuses 1. Light bulbs 37' are connected in parallel to each of the secondary windings 36', 90 and 92 for individually indicating that the corresponding secondary winding is energized.

The embodiment of FIG. 2 presents the advantage that, when an electrical appliance is connected to each outlet of the protective supply apparatus, and when a fault connection happens between the power contacts 10 of the safety connector device of one of the electrical appliances and the housing of the latter appliance, only this electrical appliance is then deactivated. The two other electrical appliances remain energized.

Figure 3:
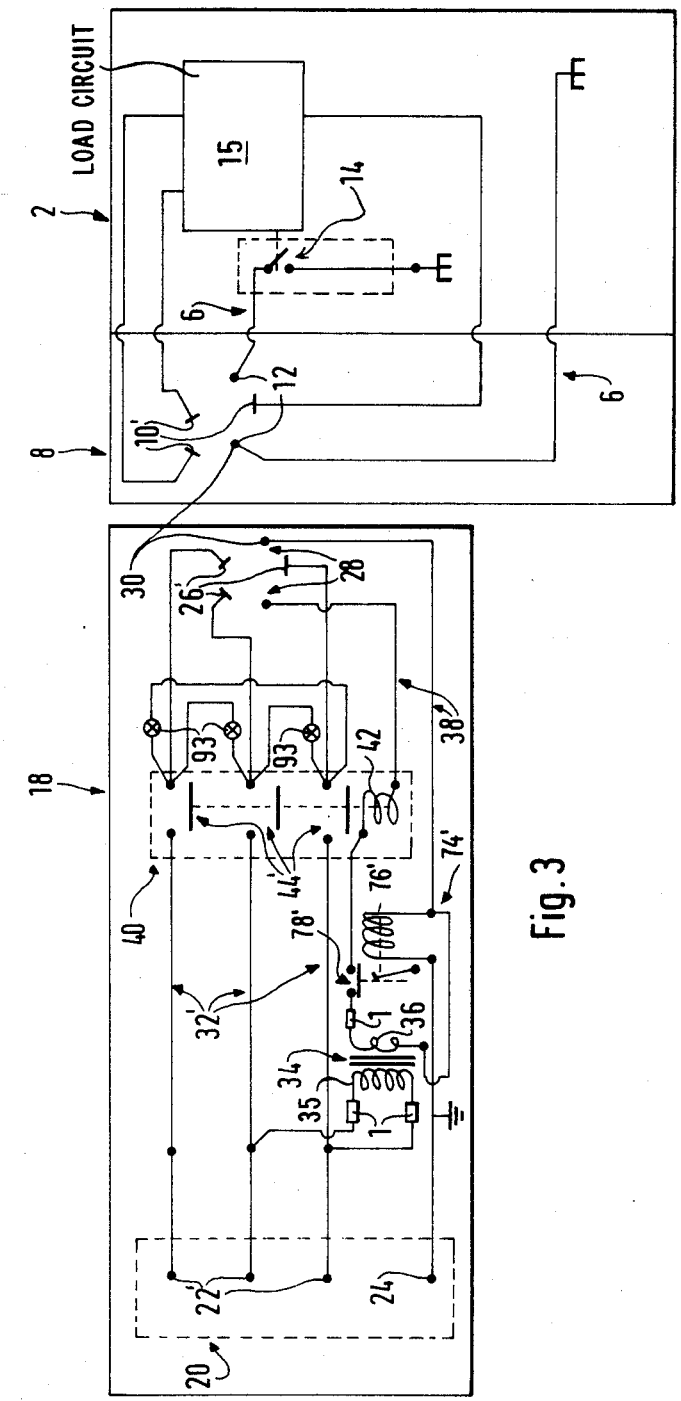
FIG. 3 represents, in a schematic diagram form, a three phase embodiment of an electrical appliance, a safety connector device and a protective supply apparatus in combination according to the present invention.

FIG. 3 illustrates another embodiment of the invention comprising in combination, a three phase electric appliance 2, a three phase safety connector device 8 and a three phase protective supply apparatus 18 for safely coupling a three phase power source (not shown) to the three phase, load circuit 15 of the electrical appliance 2. The elements of FIG. 3 which correspond to analogous ones of FIGS. 1 and 2 are identified by the same reference numerals.

In the embodiment of FIG. 3, the safety connector device comprises three power contacts 10', and the protective supply apparatus 18 comprises three power input contacts 22' to be respectively connected to the three phases of the power source (not shown), and an outlet with three power contacts 26' to be respectively connected to the three power contacts 10' of the safety connector device 8. A relay 40 comprises three normally open switches 44' connected between the three power input contacts 22' and the three power outlet contacts 26'.

Three light bulbs 93 are connected between each couple of power contacts 26' for indicating that the electrical appliance 2 is appropriately energized.

In FIG. 3, the primary winding 35 of the step-down transformer 34 is connected though a pair of fuses 1 between two ones of the contacts 22'. The secondary winding 36 of the transformer 34 produces a low amplitude current flowing through a low amplitude current path circuit 38, through a control coil 42 of the relay 40 to close the switches 44', to connect the three power outlet contacts 26' to the three power input contacts 22', respectively, and to energize the three phase, load circuit 15 of the electrical appliance 2 having the plug of its safety connector device inserted in the outlet of the apparatus 18, and through the circuit 6 including the electrically conducting housing of the appliance 2 and interconnecting the two auxiliary contacts 12. When a ground fault current from the housing of the appliance flows through the contacts 30 of FIG. 3, and through a control coil 76' of a relay 74', a normally closed switch 78' of the relay 74' open to interrupt the low amplitude current in the coil 42, to open the switches 44' and to de-energize the three-phase electrical appliance 2. The coil 42 is also de-energized and the switches 44' opened when the circuit 6 opens, which may indicate ungrounding of the appliance housing.

It can be appreciated that the above described embodiments of the present invention carries out a method of safely grounding the electrically conducting housing of an electrical appliance by connecting the housing to the ground of a power source. The method comprises the step of connecting the ground to a first point of the housing via a first contact means, and connecting a second contact means to a second point of the housing. The second point is different from the first point so that the first and second contact means are interconnected via an interconnecting circuit including the housing. The method also comprises the steps of establishing a low amplitude electric current through the first and second contact means and the circuit interconnecting these first and second contact means, and detecting the low amplitude electrical current. Detection of the latter current is indicative of the electrical interconnection of the first and second contact means through the interconnection circuit including the housing, and consequently of a safe connection of the housing of the electrical appliance to the ground of the power source. The method also comprises the step of energizing the electrical appliance upon detection of the low amplitude current.

Although the present invention has been described hereinabove by way of preferred embodiments thereof, it should be pointed out that any modification to such preferred embodiments, within the scope of the appended claims, is not deemed to alter the nature and scope of the invention.

I claim:

1. In combination, (a) an electrical appliance comprising an electrically conducting housing to be grounded, and an internal, load circuit, (b) a safety connector device comprising an electric plug having at least two first, power contacts through which the said internal, load circuit can be energized, and two second, auxiliary contacts respectively connected to two separate points of the said housing so that the said two second, auxiliary contacts are interconnected together by an interconnecting circuit including the said housing, and (c) a protective supply apparatus for safely coupling an electric power source provided with a ground and with at least two power terminals to the said internal, load circuit of the electrical appliance via the said safety connector device, comprising:

input contact means including at least two third, power contacts to be respectively connected to the said at least two power terminals, and a fourth, ground contact to be connected to the said ground of the power source;

a first outlet in which the electric plug of the said safety connector device can be inserted, said first outlet having at least two fifth, power contacts respectively connected to the said at least two first contacts when the said electric plug is inserted in the said first outlet, and two sixth auxiliary contacts respectively connected to the said two second contacts when the said electric plug is inserted in the said first outlet, a first one of said two sixth contacts, connected to a first one of the second, auxiliary contacts, being also connected to the said fourth, ground contact for grounding the said electrically conducting housing;

a first current path circuit for connecting the said at least two third power contacts to the said at least two fifth, power contacts, respectively;

a step down transformer means having a primary winding connected between the said at least two power terminals of the said source, and a first secondary winding having two winding terminals;

a second current path circuit for connecting the two terminals of the said first secondary winding to the said two sixth, auxiliary contacts, respectively, so that when the said electric plug of the safety connector device is inserted in the said first outlet a low amplitude electric current generated through the first secondary winding flows through the said second current path circuit, through the said second and sixth, auxiliary contacts and through the said interconnecting circuit including the electrically conducting housing of the electric appliance; and a first relay means having (i) a first control coil connected in series with the said second current path circuit, so that the said low amplitude current flows through said first control coil, and (ii) first normally open switch means connected in series with the said first current path circuit, closed when the said low amplitude current flows through the first control coil so that the two third contacts are connected to the two fifth contacts, respectively, and the internal, load circuit of the electrical appliance supplied with electric current from the power source through the third contacts, the first current path circuit, and the first and fifth contacts, and opened in response to a discontinuity in the said interconnecting circuit including the said housing, which discontinuity can be caused by disconnection of the said electrically conducting housing from the ground of the power source and interrupts the low amplitude electric current to open the first normally open switch means whereby the first current path circuit is opened and the internal, load circuit of the said appliance is deactivated; wherein the said safety connector device comprises an additional switch means connected in series with the said interconnecting circuit including the housing of the appliance, whereby the said internal, load circuit can be deactivated by opening said additional switch means to open the said interconnecting circuit and thereby interrupt the said low amplitude current through the said first control coil of the first relay means.

2. A combination as defined in claim 1, wherein the said additional switch means is a malfunction switch means opening the said interconnecting circuit upon sensing a malfunction in the internal, load circuit of the said electrical appliance, whereby the said internal, load circuit is deactivated upon sensing the said malfunction.

3. A combination as defined in claim 1, wherein the said protective supply apparatus also comprises:
at least one second outlet having a pair of power contacts and a pair of auxiliary contacts, one contact of the pair of auxiliary contacts of the said at least one second outlet being connected to the fourth, ground contact;
a third current path circuit for connecting the two power contacts of the said at least one second outlet to the two third power contacts, respectively;
a fourth current path circuit for connecting the two auxiliary contacts of the said at least one second outlet to the two terminals of the first secondary winding of the said step-down transformer means, respectively; and
a second relay means comprising a second control coil connected in series with the said fourth current path circuit, and second normally open switch means connected in series with the said third current path circuit, closed when the second coil is energized, and open when the second coil is de-energized.

4. A combination as defined in claim 3, wherein the said protective supply apparatus further comprises a third relay means having (a) a third control coil, the said first one of the sixth contacts and the said one auxiliary contact of the said at least one second outlet being both connected to the said fourth contact via the said third control coil, and (b) normally closed switch means connected in series with both the first and third current path circuits, said third relay means comprising means for opening the said normally closed switch means in response to a ground fault current from the said first one of the sixth auxiliary contacts or from the said one contact of the pair of auxiliary contacts of the said at least one second outlet, supplied through the third control coil, whereby the power contacts of the said first outlet and at least one second outlet are disconnected from the terminals of the power source.

5. A combination as defined in claim 1, wherein the said protective supply apparatus further comprises:
at least one second outlet having a pair of power contacts and a pair of auxiliary contacts, a first one of said auxiliary contacts of the said at least one second outlet being connected to the said fourth, ground contact;
a third current path circuit for connecting the pair of power contacts of the said at least one second outlet to the said two third power contacts, respectively;
said step down transformer means comprising a second secondary winding having two winding terminals;
a fourth current path circuit for connecting the pair of auxiliary contacts of the said at least one second outlet to the two winding terminals of the said second secondary winding; and
a second relay means comprising a second control coil connected in series with the said fourth current path circuit, and second normally open switch means connected in series with the said third current path circuit.

6. A combination as defined in claim 5, wherein the said protective supply apparatus further comprises:
a third relay means having a third control coil and a pair of normally closed switch means, the said first one of the two sixth, auxiliary contacts being connected to the said fourth, ground contact through the said third control coil, and the said two fifth, power contacts being connected to the said two third, power contacts through the pair of normally closed switch means of said third relay means, respectively; and
a fourth relay means having a fourth control coil and a pair of normally closed switch means, said first one of the pair of auxiliary contacts of the said at least one second outlet being connected to the said fourth, ground contact through the said fourth control coil, and the pair of power contacts of the said at least one second outlet being connected to the said two third, power contacts through the pair of normally closed switch means of the said fourth relay means, respectively.

7. A combination as defined in claim 1, wherein the electric power source is a three phase power source, the said at least two power terminals of the electric power source comprise three power terminals, the said at least two first power contacts of the said electric plug comprise three first, power contacts, the said at least two fifth, power contacts of the first outlet comprise three fifth power contacts respectively connected to the said three first, power contacts when the electric plug is inserted in the said first outlet, the said at least two third, power contacts of the input contact means comprise three third, power contacts to be respectively connected to the three terminals of the said three phase source and respectively connected to the three fifth power contacts through the said first current path circuit, and the said first normally open switch means comprises three normally open switches each connected in the first current path circuit and respectively interposed between the three pairs of interconnected third and fifth contacts.

8. In combination, (a) an electrical appliance comprising an electrically conducting housing to be grounded, and an internal, load circuit, (b) a safety connector device comprising an electric plug having at least two first, power contacts through which the said internal, load circuit can be energized, and two second auxiliary contacts respectively connected to two separate points of the said housing so that the said two second, auxiliary contacts are interconnected together by an interconnecting circuit including the said housing, and (c) a protective supply apparatus for safely coupling an electric power source provided with a ground and with at least two power terminals to the said internal, load circuit of the electrical appliance via the said safety connector device, comprising:

input contact means including at least two third, power contacts to be respectively connected to the said at least two power terminals, and a fourth, ground contact to be connected to the said ground of the power source;
 a first outlet in which the electric plug of the said safety connector device can be inserted, said first outlet having at least two fifth, power contacts respectively connected to the said at least two first contacts when the said electric plug is inserted in the said first outlet, and two sixth auxiliary contacts respectively connected to the said two second contacts when the said electric plus is inserted in the said first outlet, a first one of said two sixth contacts, connected to a first one of the second, auxiliary contacts, being also connected to the said fourth, ground contact for grounding the said electrically conducting housing;
 a first current path circuit for connecting the said at least two third power contacts to the said at least two fifth, power contacts, respectively;
 a step down transformer means having a primary winding connected between the said at least two power terminals of the said source, and a first secondary winding having two winding terminals;
 a second current path circuit for connecting the two terminals of the said secondary winding to the said two sixth, auxiliary contacts, respectively, so that when the said electric plug of the safety connector device is inserted in the said first outlet a low amplitude electric current generated through the first secondary winding flows through the said second current path circuit, through the said second and sixth, auxiliary contacts and through the said interconnecting circuit including the electrically conducting housing of the electric appliance; and
 a first relay means having (i) a first control coil connected in series with the said second current path circuit, so that the said low amplitude current flows through said first control coil, and (ii) first normally open switch means connected in series with the said first current path circuit, closed when the said low amplitude current flows through the first control coil so that the two third contacts are connected to the two fifth contacts, respectively, and the internal, load circuit of the electrical appliance supplied with electric current from the power source through the third contacts, the first current path circuit, and the first and fifth contacts, and opened in response to a discontinuity in the said interconnecting circuit including the said housing, which discontinuity can be caused by disconnection of the said electrically conducting housing from the ground of the power source and interrupts the low amplitude electric current to open the first normally open switch means whereby the first current path circuit is opened and the internal, load circuit of the said appliance is deactivated;
 wherein said first outlet can be covered, and wherein the said protective supply apparatus comprises switch means (a) for disconnecting the said primary winding of the step down transformer means from one of the said at least two power terminals of the said source and for opening the second current path circuit, when the said first outlet is covered, and (b) for connecting the primary winding of the said step down transformer means between the said at least two power terminals of the said source and for closing said second current path circuit, when the first outlet is not covered.

* * * * *